(12) United States Patent
Kuroki et al.

(10) Patent No.: US 8,786,778 B2
(45) Date of Patent: Jul. 22, 2014

(54) TIMING CONTROL APPARATUS AND VIDEO PROCESSING SYSTEM

(71) Applicant: Canon Kabushiki Kaisha, Tokyo (JP)

(72) Inventors: Daisuke Kuroki, Kawasaki (JP);
Shinichi Sunakawa, Kawasaki (JP);
Kohei Murayama, Kawasaki (JP);
Atsushi Date, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/690,580

(22) Filed: Nov. 30, 2012

(65) Prior Publication Data

US 2013/0155321 A1   Jun. 20, 2013

(30) Foreign Application Priority Data

Dec. 15, 2011   (JP) .................................. 2011-275090

(51) Int. Cl.
| | |
|---|---|
| *H04N 5/04* | (2006.01) |
| *H04N 9/44* | (2006.01) |
| *H04N 9/475* | (2006.01) |
| *H04N 9/74* | (2006.01) |
| *G06K 9/00* | (2006.01) |

(52) U.S. Cl.
USPC ............ 348/501; 348/515; 348/588; 382/181

(58) Field of Classification Search
None
See application file for complete search history.

(56) References Cited

U.S. PATENT DOCUMENTS

| | | | | |
|---|---|---|---|---|
| 5,442,406 | A | * | 8/1995 | Altmanshofer et al. ....... 348/588 |
| 6,392,707 | B1 | * | 5/2002 | Cooper et al. ................ 348/515 |
| 7,088,860 | B2 | * | 8/2006 | Matsugu et al. .............. 382/181 |

FOREIGN PATENT DOCUMENTS

JP          10-084519 A        3/1998

* cited by examiner

*Primary Examiner* — Jefferey Harold
*Assistant Examiner* — Sean Haiem
(74) *Attorney, Agent, or Firm* — Fitzpatrick, Cella, Harper & Scinto

(57) ABSTRACT

A timing control apparatus includes: an extraction unit that outputs an input timing signal of an image signal; an input timing switch unit that selects whether to output the input timing signal output from the extraction unit or to input an external input timing signal; an input timing delay addition unit capable of adding delay information to the input timing signal output from the extraction unit; a reference timing generation unit that generates a reference timing signal from the input timing signal; a reference timing switch unit that selects whether to output the reference timing signal or to input an external reference timing signal; and an individual timing generation unit that generates, from the reference timing signal, a video processing timing signal and an output timing signal.

8 Claims, 7 Drawing Sheets

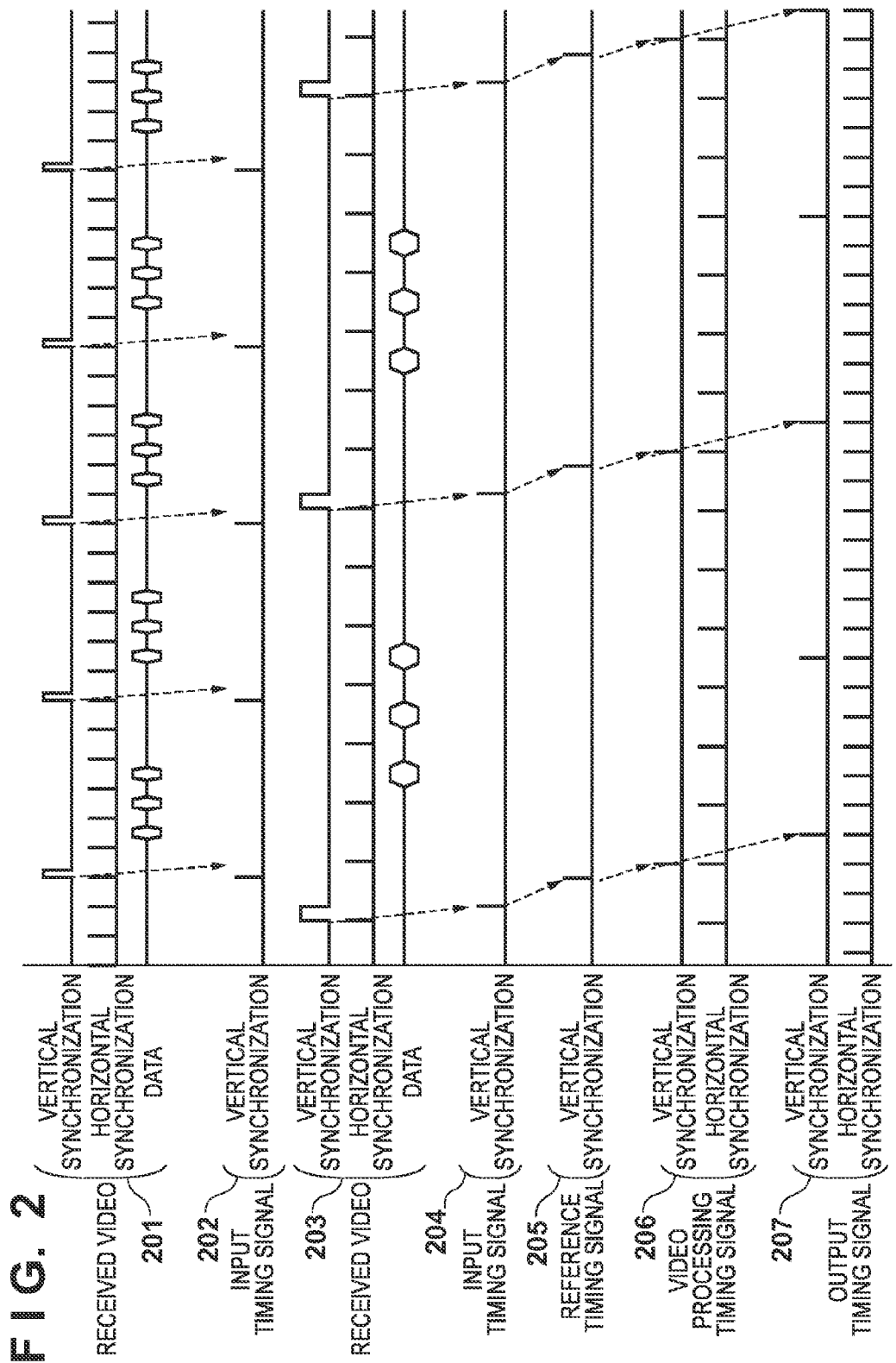

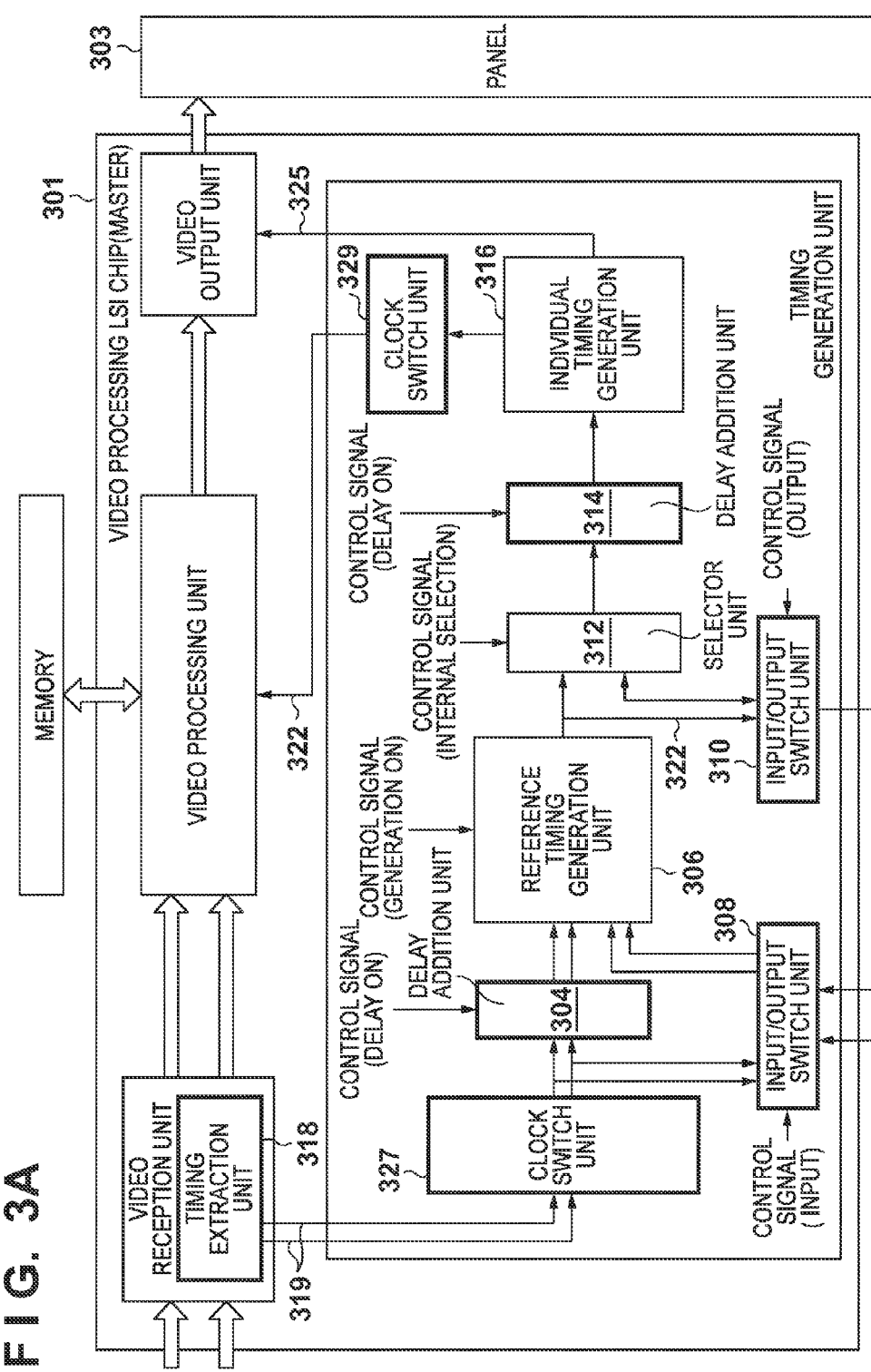

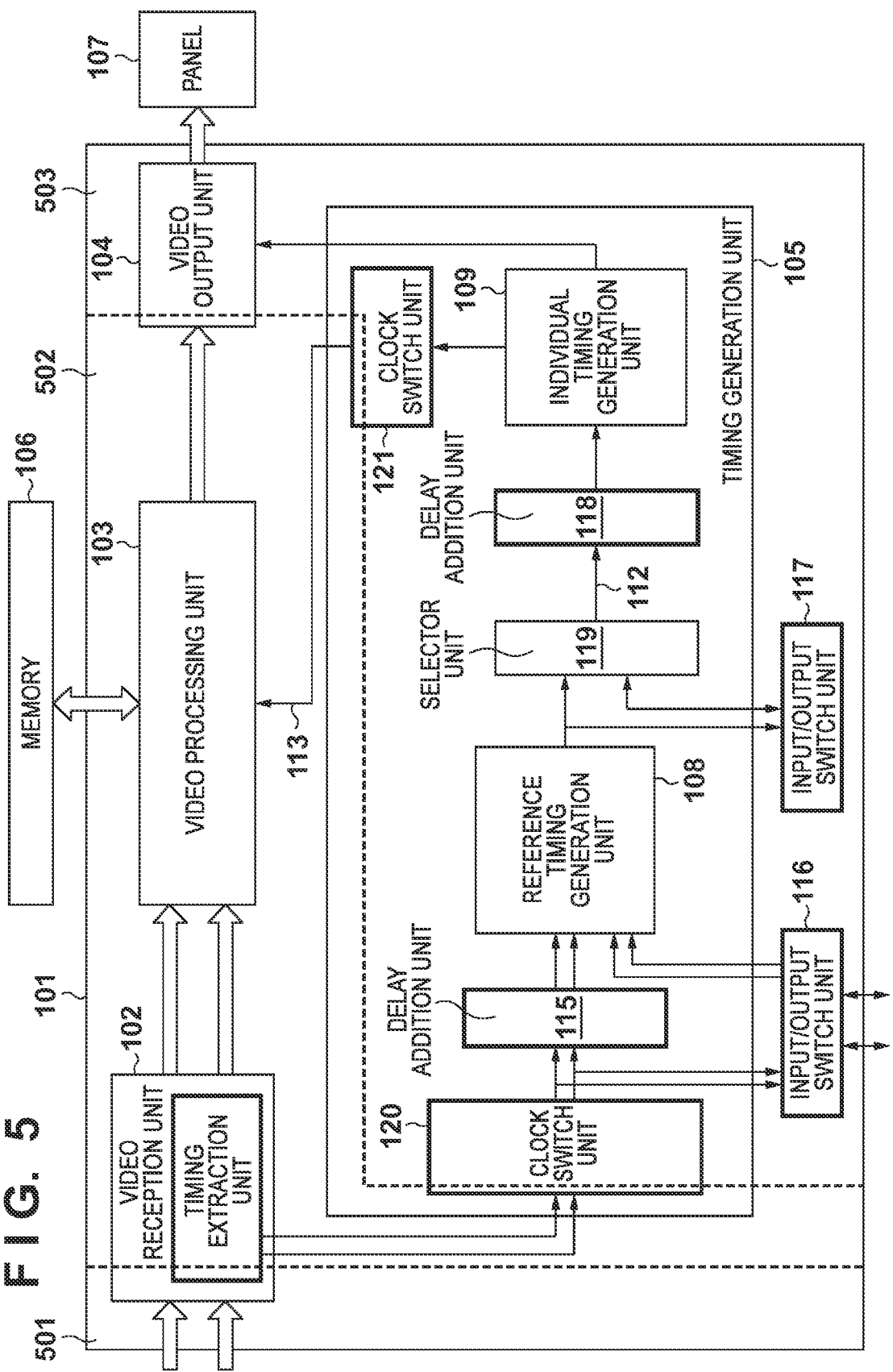

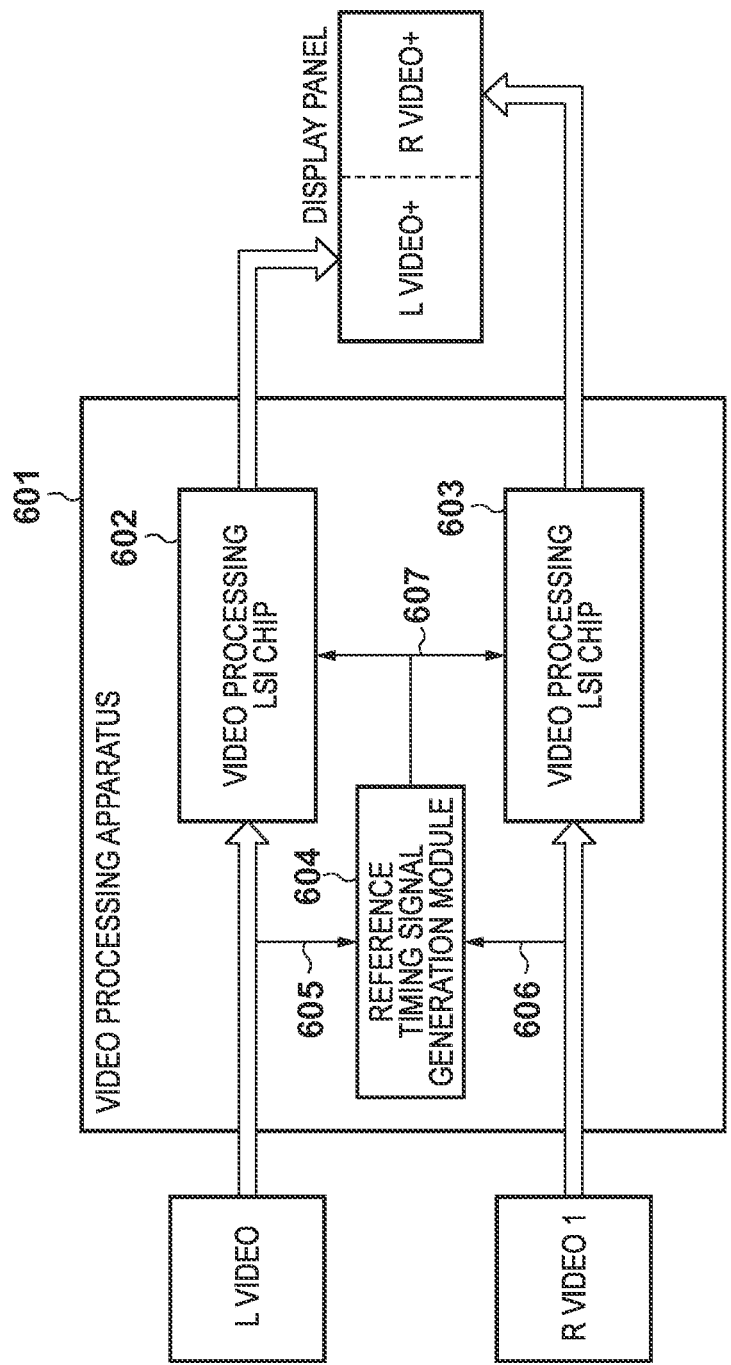

TIMING CONTROL APPARATUS AND VIDEO PROCESSING SYSTEM

BACKGROUND OF THE INVENTION

1. Field of the Invention

The present invention relates to a timing control apparatus and a video processing system.

2. Description of the Related Art

Video display apparatuses have functions of receiving image signals to be displayed, performing video processing, and then outputting the image signals to a display device. Representative examples of such video display apparatuses include digital televisions and liquid crystal projectors. There are various types of video processing, such as a noise removal process, an edge emphasis process, and a super-resolution process for converting a low-resolution video to a higher-resolution video. Such video processing is a differentiating feature of video display apparatuses. The output of image signals comes in a wide variety of types, ranging from the output compliant with general VESA standards to signal formats and timings unique to each display device. Furthermore, a technique is commonly used whereby the cost of a video display apparatus is cut down by aggregating functions of receiving image signals, performing video processing and outputting the image signals into a single video processing LSI chip.

Digital televisions and personal computers typically have resolutions such as Full HD (1920×1080) and WUXGA (1920×1200). Meanwhile, with the development of higher-resolution display devices such as 4K2K (4096×2160) and ultra-high definition (7680×4320), dissemination of video display apparatuses including such display devices has begun. In the case of a high-resolution video, video input/output interfaces and memory interfaces with a larger bandwidth are required to receive image signals, perform video processing and output image signals, and moreover, the amount of operation increases. Therefore, there are times when a single video processing LSI chip cannot handle all processes.

In view of this, there is a method for spatially dividing a video and processing the video on a per-division basis in order to receive a high-resolution video, perform video processing and output the high-resolution video. One example is a method for horizontally dividing a video in half and causing two video processing LSI chips to operate in parallel in synchronization to receive image signals of the spatially divided video, perform video processing, and output the image signals to a display device. When causing two video processing LSI chips to operate in parallel, the image signals need to be output to the display device in synchronization. Therefore, in a two-chip configuration, two video processing LSI chips are caused to operate in synchronization by providing a module that generates a signal serving as a reference timing separately from the two video processing LSI chips and distributing the reference timing signal to the two video processing LSI chips. This configuration is shown in FIG. 6. A video processing apparatus 601 realizes functions of receiving image signals, performing video processing and outputting the image signals using video processing LSI chips. A video processing LSI chip 602 receives an L video which is a left-side video, performs video processing based on a reference timing signal 607 generated by a reference timing generation module 604, and outputs an L video+ to a display panel as an image signal. Similarly, a video processing LSI chip 603 receives an R video which is a right-side video, performs video processing based on the reference timing signal 607 generated by the reference timing generation module 604, and outputs an R video+ to the display panel as an image signal. The reference timing generation module 604 receives an input synchronizing signal 605 of the L video and an input synchronizing signal 606 of the R video, and generates the reference timing signal 607. Here, the reference timing signal 607 is generated by absorbing a difference between the two synchronizing signals, namely the input synchronizing signal 605 of the L video and the input synchronizing signal 606 of the R video, in consideration of conversion of a video frame rate and incorrect ordering of video frames between the input and the output.

According to Japanese Patent Laid-Open No. 10-84519, an additional module is not necessary because a video display apparatus that generates and outputs image signals shares a reference timing signal generation module built therein with another video display apparatus.

However, providing a module that generates a reference timing signal from a plurality of input image signals increases the cost of a video display apparatus. In the case where two divided image signals are separately input to video processing LSI chips, the two input image signals are not necessarily synchronous. A module that generates a reference timing signal needs to generate the reference timing signal with reference to synchronizing signals of the two image signals. In particular, in image signals compliant with SMPTE 425 (3G-SDI) and SMPTE 292M (HD-SDI), the synchronizing signals are embedded as timing codes in data. Therefore, a module that generates a reference timing signal increases the number of chip terminals for importing data signals and necessitates a decoding function of extracting the synchronizing signals, thus contributing to a further increase in the cost.

Moreover, the method described in Japanese Patent Laid-Open No. 10-84519 does not take into consideration a delay in the input image signals between video display apparatuses. Therefore, in a configuration using a plurality of video display apparatuses, it is difficult to exactly match the output timings of the image signals.

SUMMARY OF THE INVENTION

In view of the above problems, the present invention provides technology for controlling the operational timing of a video processing LSI chip without providing an external module for generating a reference timing outside the video processing LSI chip.

According to one aspect of the present invention, there is provided a timing control apparatus mounted on a video processing LSI chip including a reception unit that receives an image signal, a video processing unit that performs video processing on the image signal, and an output unit that outputs the image signal on which the video processing has been performed, the timing control apparatus comprising: an extraction unit configured to extract, from the image signal received by the reception unit, information defining a timing for processing the image signal, generate an input timing signal from the information, and output the input timing signal; an input timing switch unit configured to select whether to output the input timing signal output from the extraction unit from the video processing LSI chip, or to input an external input timing signal; an input timing delay addition unit configured to add delay information for delaying the input timing signal output from the extraction unit to the input timing signal; a reference timing generation unit configured to generate, from an input timing signal, a reference timing signal that serves as a reference for an operation of the video processing LSI chip; a reference timing switch unit configured to select whether to output the reference timing signal from the video processing LSI chip, or to input an external reference timing signal; and an individual timing generation unit configured to generate, from a reference timing signal, a video processing timing signal defining a timing for the video processing of the video processing unit and an output timing signal defining a timing for the output of the output unit.

The present invention allows controlling the operational timing of a video processing LSI chip without providing an external module for generating a reference timing outside the video processing LSI chip.

Further features of the present invention will become apparent from the following description of exemplary embodiments (with reference to the attached drawings).

BRIEF DESCRIPTION OF THE DRAWINGS

FIG. 2 illustrates timing signals.

FIGS. 3A and 3B illustrate a configuration using two video processing LSI chips.

FIG. 5 illustrates clock regions in a video processing LSI chip.

FIG. 6 illustrates a conventional system configuration for handling a high-resolution video.

DESCRIPTION OF THE EMBODIMENTS

Embodiment 1

Figure 1:
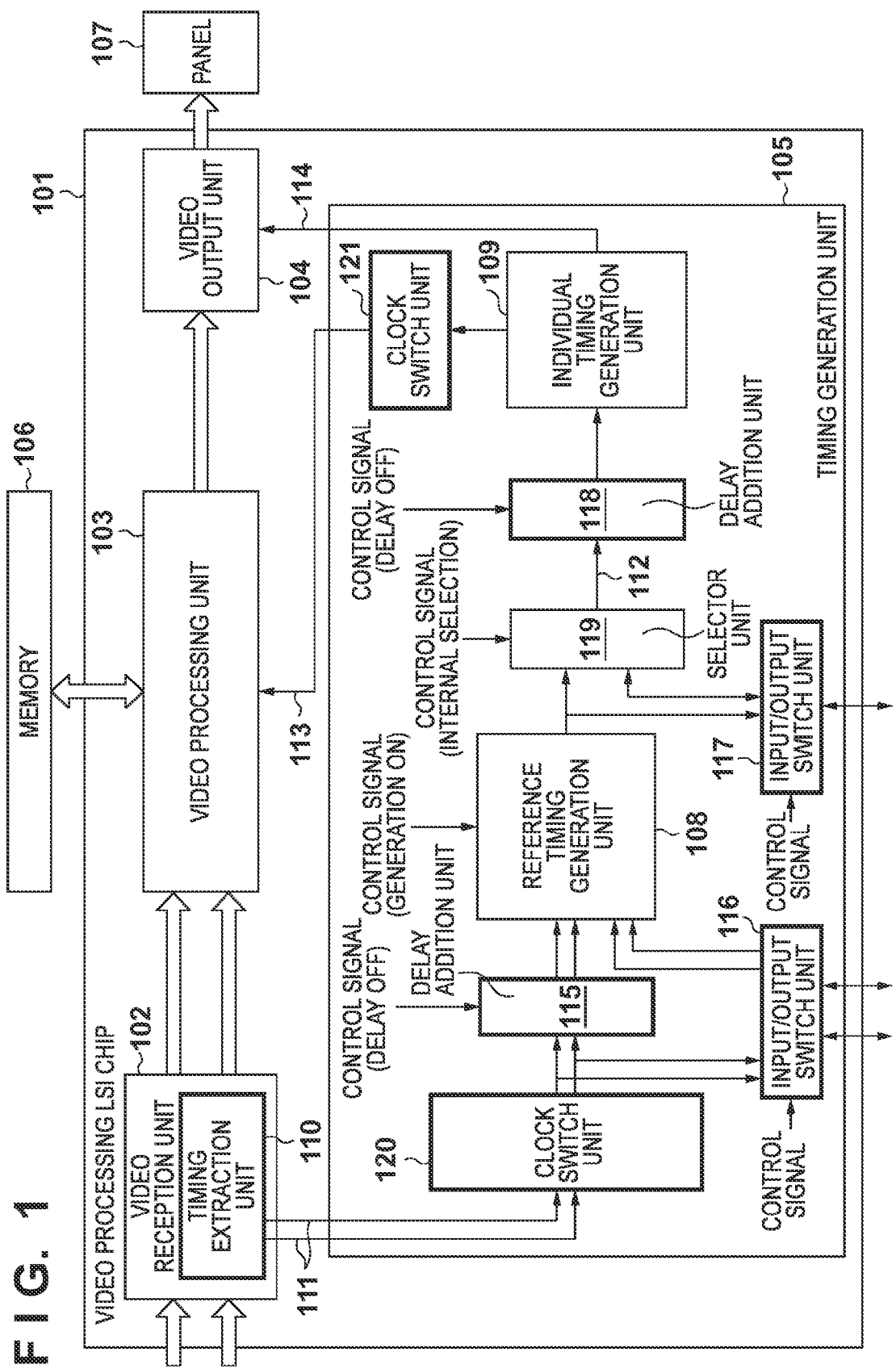
FIG. 1 shows an overall configuration of a video processing LSI chip according to the present invention.

A description is now given of Embodiment 1 with reference to FIGS. 1 to 5. FIG. 1 shows an overall configuration of a video processing LSI chip according to Embodiment 1 of the present invention. A video processing LSI chip 101 is an LSI chip into which functions of receiving image signals, performing video processing and outputting the image signals are aggregated. A video reception unit 102, a video processing unit 103 and a video output unit 104 are included in the video processing LSI chip 101. The video reception unit 102 can receive two image signals. The video reception unit 102 may receive image signals obtained by dividing one video into two, and may receive two different videos. The video processing unit 103 receives the image signals from the video reception unit 102 and performs video processing, such as high image quality processing and processing adapted for the characteristics of an output panel, via a memory 106. The video output unit 104 receives an image signal from the video processing unit 103, synchronizes the received image signal with an output clock in accordance with an interface protocol of a panel 107 (display device), and outputs the synchronized image signal to the panel 107 so as to cause the panel 107 to display the synchronized image signal.

The video processing LSI chip 101 further includes a timing generation unit 105 (timing control apparatus) as a module that generates operational timings of the video processing unit 103 and the video output unit 104. The timing generation unit 105 (timing control apparatus) is mounted on the video processing LSI chip and includes a reference timing generation unit 108 and an individual timing generation unit 109 as constituent elements. Based on the timings of received image signals, the reference timing generation unit 108 generates a reference timing signal 112 that serves as a basic operational timing of the video processing LSI chip 101. The individual timing generation unit 109 generates a video processing timing signal 113 that serves as the operational timing of the video processing unit 103 and an output timing signal 114 that serves as the operational timing of the video output unit 104 from the reference timing signal 112.

The video reception unit 102 includes a timing extraction unit 110. The timing extraction unit 110 extracts vertical synchronizing timings, which are timing information, from the image signals received by the video reception unit 102, and transmits the vertical synchronizing timings to the timing generation unit 105 (timing control apparatus) as input timing signals 111. The video reception unit 102 can receive a plurality of image signals (e.g. two image signals). The timing extraction unit 110 in the video reception unit 102 can extract a plurality of input timing signals 111 (in the case of FIG. 1, two input timing signals). When the video reception unit 102 receives a data signal and a vertical synchronizing signal separately, the timing extraction unit 110 generates an input timing signal 111 from the vertical synchronizing signal. In image signals compliant with SMPTE 425 (3G-SDI) and SMPTE 292M (HD-SDI), vertical synchronizing signals are embedded as timing codes in data. In this case, the timing extraction unit 110 generates the input timing signals 111 after decoding data signals and extracting the vertical synchronizing signals.

The video processing LSI chip 101 further includes a delay addition unit 115, a delay addition unit 118, an input/output switch unit 116 (first input/output switch unit), and an input/output switch unit 117 (second input/output switch unit). The delay addition unit 115, arranged between the timing extraction unit 110 and the reference timing generation unit 108, is an input timing delay addition unit that can add delay information to the input timing signals 111 based on a control signal (hereinafter, the delay information may simply be referred to as "delay"). The delay addition unit 118, arranged previous to the individual timing generation unit 109, is a reference timing delay addition unit that can add a delay to the reference timing signal 112 based on a control signal.

The input/output switch unit 116 selects whether to output the internal input timing signals from a chip terminal of the video processing LSI chip or to input external signals from the chip terminal and then input the external signals to the reference timing generation unit 108 as input timing signals. That is to say, the input/output switch unit 116 functions as an input timing switch unit that switches between internal input timing signals and input timing signals based on external signals. The input timing signals input via the input/output switch unit 116 (external signals) are input to the reference timing generation unit 108 without passing through the delay addition unit 115. The input/output switch unit 117 selects whether to output the reference timing signal generated by the reference timing generation unit 108 from the chip terminal of the video processing LSI chip or to input an external signal from the chip terminal as a reference timing signal. That is to say, the input/output switch unit 117 functions as a reference timing switch unit that switches between a signal generated by the reference timing generation unit and a signal based on an external signal.

A selector unit 119 selects whether to use a signal generated by the reference timing generation unit 108 or to use a signal input from outside via the input/output switch unit 117, and outputs the selected signal as the reference timing signal 112.

The video processing LSI chip 101 further includes a clock switch unit 120 (first clock switch unit) and a clock switch unit 121 (second clock switch unit).

In order to generate proper timing information for driving the panel 107, the timing generation unit 105 causes the reference timing generation unit 108 and the individual timing generation unit 109 to operate in accordance with the timing of a video output clock of the video output unit 104.

The clock switch unit 120 converts the input timing signals 111 transmitted in accordance with the timing of a clock of the video reception unit 102 to the timing of a clock of the timing generation unit 105. Similarly, the clock switch unit 121 converts the video processing timing signal 113 based on the timing of the clock of the timing generation unit 105 to the timing of a clock of the video processing unit 103.

A description is now given of clock regions in the video processing LSI chip with reference to FIG. 5. The video processing LSI chip is divided into three regions (regions 501, 502 and 503) by dotted lines. The region 501 includes a part of the video reception unit 102 and operates in accordance with a clock of the input image signals. The region 502 includes the video reception unit 102 and the video processing unit 103 and operates in accordance with a video processing clock. The region 503 includes the timing generation unit 105 and the video output unit 104 and operates in accordance with an output clock. Therefore, the clock switch unit 120 switches from the video processing clock to the output clock. On the other hand, the clock switch unit 121 switches from the output clock to the video processing clock.

The following describes timing signals with reference to FIG. 2. A received video 201 and a received video 203 are image signals received by the video reception unit 102. The received video 201 and the received video 203 are composed of a vertical synchronizing signal, a horizontal synchronizing signal, and video data. The image signal of the received video 201 and the image signal of the received video 203 have different frequencies. The timing extraction unit 110 extracts only the vertical synchronizing signal from the received video 201 and outputs the extracted vertical synchronizing signal as an input timing signal 202. Similarly, the timing extraction unit 110 extracts only the vertical synchronizing signal from the received video 203 and outputs the extracted vertical synchronizing signal as an input timing signal 204. The reference timing generation unit 108 receives the input timing signals 202 and 204, and generates a reference timing signal 205 which is a vertical synchronizing timing serving as a basic operational timing of the video processing LSI chip 101. Provided that the received video 203 is a basic video to be displayed on the panel, the reference timing generation unit 108 generates the vertical synchronizing timing serving as the reference timing signal 205 from the vertical synchronizing timing serving as the input timing signal 204. Even when the received video 203 is suddenly cut off, the video output unit 104 needs to output some sort of video to the panel 107. In view of this, the reference timing generation unit 108 has a function of detecting a loss of the input timing signal 204 and generating a unique reference timing. Upon receiving the reference timing signal 205, the individual timing generation unit 109 generates a video processing timing signal 206 and an output timing signal 207. The video processing unit 103 requires a vertical synchronizing timing and a horizontal synchronizing timing, and performs video processing at the same rate as the received video 203. The video output unit 104 requires a vertical synchronizing timing and a horizontal synchronizing timing, and outputs a video at a rate twice as high as the rate of the received video 203. The individual timing generation unit 109 includes a counter and generates a vertical synchronizing signal and a horizontal synchronizing signal as the video processing timing signal 206. The individual timing generation unit 109 also generates a vertical synchronizing signal and a horizontal synchronizing signal at a rate twice as high as the rate of the reference timing signal 205 as the output timing signal 207.

When the video display apparatus is configured using one video processing LSI chip as shown in FIG. 1, the delay addition units 115 and 118 need not add a delay to timing signals, and therefore their delay operations are set to an OFF state. The selector unit 119 uses the reference timing signal from the reference timing generation unit 108, and is therefore set to select an internal signal. Furthermore, as timing signals are not input/output via the chip terminal, settings for the input/output switch units 116 and 117 are not necessary.

Embodiment 2

Figure 3B:
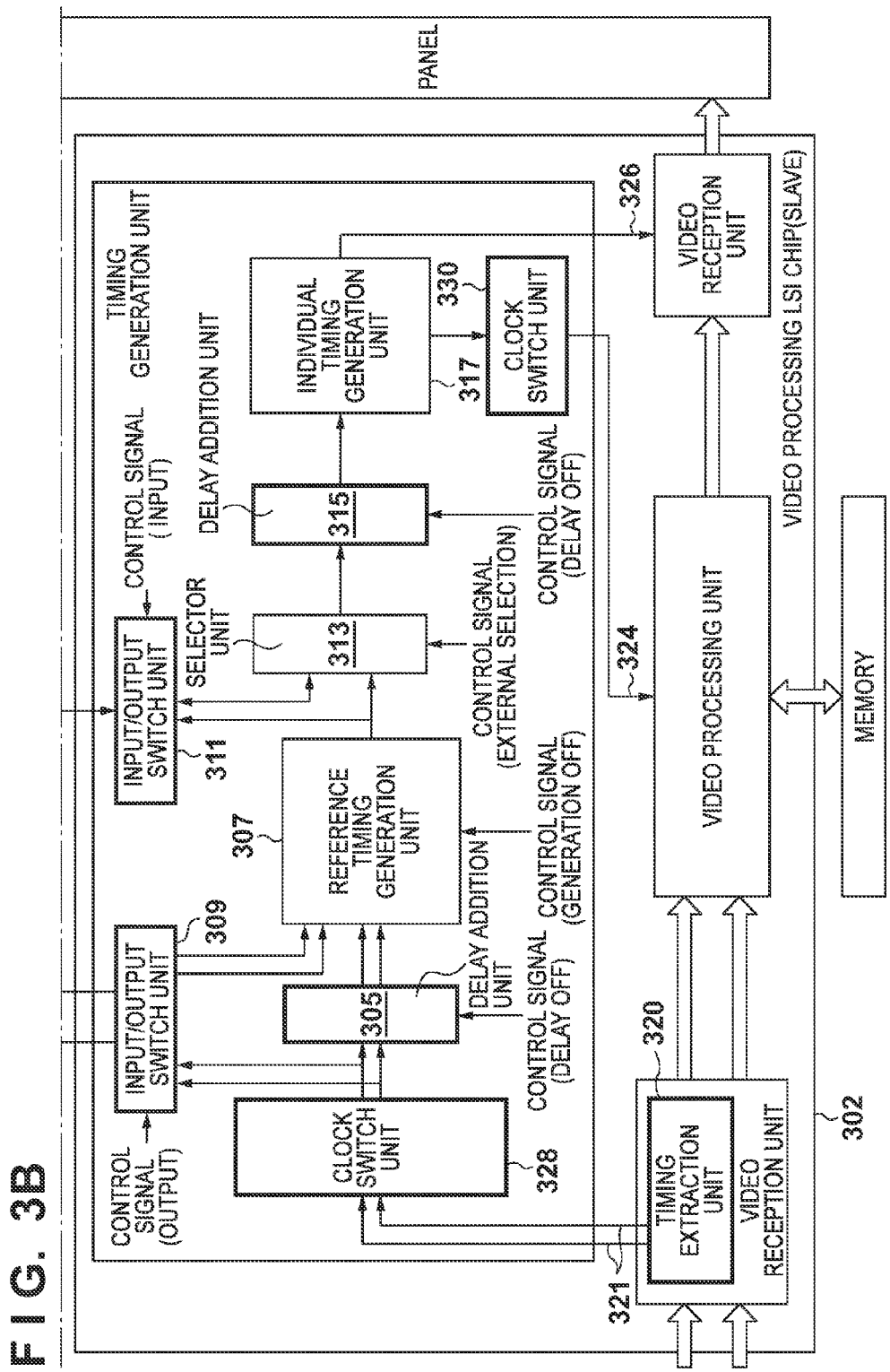

A description is now given of a configuration of a video processing system using two video processing LSI chips with reference to FIGS. 3A and 3B. The video processing system causes a plurality of video processing LSI chips to operate in synchronization so as to process divided videos obtained by dividing one video in parallel. In order to process a high-resolution video for which a single video processing LSI chip cannot keep up with processing, two video processing LSI chips 301 and 302 that have the same configuration as the video processing LSI chip 101 are used to perform video processing. In the present embodiment, a high-resolution video is spatially divided into four parts, the four parts are separated into two groups each including two different image signals, and each group is input to a different one of the two chips. Each video processing LSI chip performs image processing on the received two image signals based on a video processing timing signal from a timing generation unit provided therein. Then, each video processing LSI chip merges the two image signals into one image signal and outputs the merged image signal to a panel 303, which is a display device, based on an output timing signal from the timing generation unit provided therein. The panel 303 is compatible with high resolution. Upon receiving two image signals from the video processing LSI chips 301 and 302, the panel 303 displays the video.

In general, the four image signals that are obtained through the spatial division and input to the video processing LSI chips 301 and 302 are not necessarily synchronous depending on transmission apparatuses and transmission paths. Still, the two video processing LSI chips 301 and 302 need to output synchronous image signals to the panel 303. That is to say, in order to display a high-resolution video, the video processing LSI chips 301 and 302 need to receive four asynchronous image signals, perform video processing, and then output two synchronous image signals.

In the case of a two-chip configuration, one chip that generates a reference timing signal operates as a master chip, and the other chip operates as a slave chip. The video processing LSI chip 301 operates as a master chip. The video processing LSI chip 302 operates as a slave chip.

The two video processing LSI chips are connected to each other by three signal lines, two of them being signal lines for transmitting/receiving input timing signals via input/output switch units 308 and 309, and one being a signal line for transmitting/receiving a reference timing signal via input/output switch units 310 and 311.

In the case of a two-chip configuration, a reference timing generation unit 306 in the video processing LSI chip 301, which is the master, receives input timing signals of the four image signals and generates a reference timing signal 322. The input switch unit 309 in the video processing LSI chip 302, which is the slave, is controlled to serve as an output side, whereas the input switch unit 308 in the video processing LSI chip 301, which is the master, is controlled to serve as an input side. In this way, input timing signals 321 output from a timing extraction unit 320 in the slave can be transmitted to the reference timing generation unit 306 in the master.

When transmitting the input timing signals 321 to the reference timing generation unit 306, they additionally pass through a flip-flop circuit and are thus delayed compared to input timing signals 319 output from a timing extraction unit 318 in the master.

In view of this, a delay operation of a delay addition unit 304 in the master is set to an ON state so that a delay is added only to the input timing signals 319 by the delay addition unit 304. As a result of adding a delay to the input timing signals 319, the four input timing signals input to the reference timing generation unit 306 remain synchronous.

In this way, the reference timing generation unit 306 in the master can generate one reference timing signal for the two video processing LSI chips from the four image signals. The reference timing generation unit 306 in the master generates the reference timing signal 322, which serves as a reference operational timing for synchronizing the operations of the video processing LSI chips 301 and 302, from the four input timing signals. The reference timing generation unit 306 then transmits the generated reference timing signal 322 to the individual timing generation unit 316 in the master and to the individual timing generation unit 317 in the slave. In accordance with control signals, the input/output switch unit 310 in the master operates as an output side, and the input/output switch unit 311 in the slave operates as an input side.

Also, a selector unit 313 in the slave is set to select an external signal as a reference timing signal in accordance with an external selection control signal for selecting an external signal. In this way, the reference timing signal 322 output from the reference timing generation unit 306 in the master can be transmitted to the individual timing generation unit 317 in the slave. A selector unit 312 in the master is set to select a reference timing signal from the reference timing generation unit 306 in accordance with an internal selection control signal for selecting an internal signal.

When transmitting the reference timing signal 322 to the individual timing generation unit 317 in the slave, the reference timing signal 322 additionally passes through a flip-flop circuit. As a result, the reference timing signal 322 input to the individual timing generation unit 317 is delayed compared to the reference timing signal 322 input to the individual timing generation unit 316 in the master. In view of this, a delay is added only to the input timing signal to the individual timing generation unit 316 in the master by setting a delay operation of a delay addition unit 314 to an ON state and setting a delay operation of a delay addition unit 315 to an OFF state. In this way, the reference timing signal to the individual timing generation unit 316 in the master and the reference timing signal to the individual timing generation unit 317 in the slave can be synchronized with each other. Consequently, it is possible to generate a video processing timing signal 323 in the master and a video processing timing signal 324 in the slave in synchronization with each other, and to generate an output timing signal 325 in the master and an output timing signal 326 in the slave in synchronization with each other. That is to say, the two video processing LSI chips 301 and 302 can output videos in synchronization.

In the video processing LSI chip 302, which is the slave, the reference timing generation unit 307 need not generate a reference timing, and therefore its generation operation may be set to an OFF state using a control signal.

In FIGS. 3A and 3B, the operations of clock switch units 327 and 328 are similar to the operation of the clock switch unit 120 in FIG. 1, and the operations of clock switch units 329 and 330 are similar to the operation of the clock switch unit 121 in FIG. 1.

Figure 4:
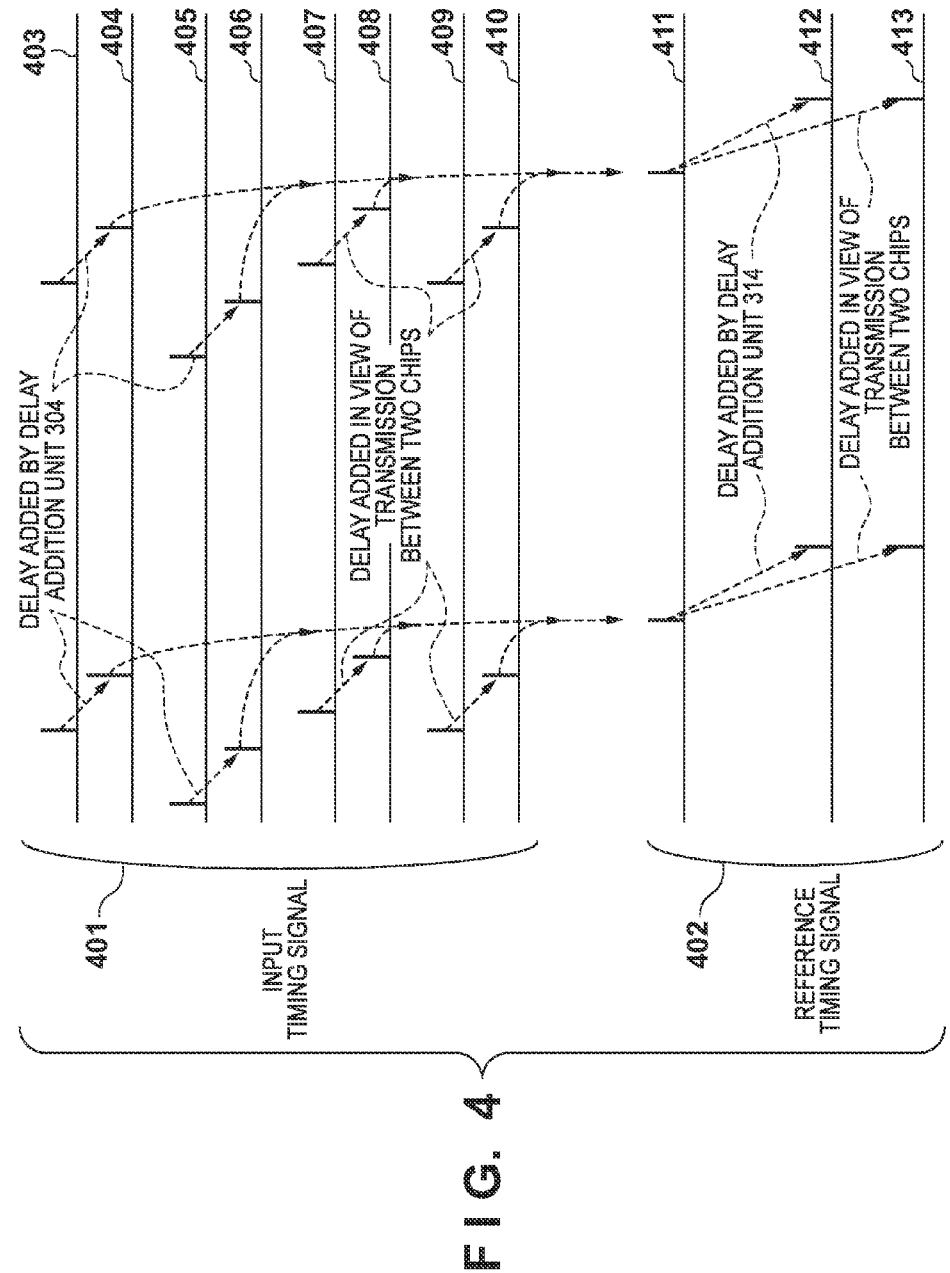
FIG. 4 illustrates timing signals for a two-chip configuration.

The following describes timing signals for the case where two video processing LSI chips are used with reference to FIG. 4. In FIG. 4, 401 denotes input timing signals. More specifically, 403 and 405 denote input timing signals output from the timing extraction unit 318 in the master. Also, 404 and 406 denote input timing signals entering the reference timing generation unit 306 in the master. A delay has been added thereto by the delay addition unit 304 in the master. Also, 407 and 409 denote input timing signals output from the timing extraction unit 320 in the slave. Also, 408 and 410 denote input timing signals entering the reference timing generation unit 306 in the master. A delay has been added thereto in view of transmission between two chips. Here, the amount of delay added by the delay addition unit 304 equals the amount of delay added in view of transmission between two chips. As a result, the relationship between the input timing signals 403, 405, 407 and 409 equals the relationship between the input timing signals 404, 406, 408 and 410 entering the reference timing generation unit 306.

In FIG. 4, 402 denotes reference timing signals. The reference timing generation unit 306 generates a reference timing signal 411 from the input timing signals 404, 406, 408 and 410. Also, 412 denotes a reference timing signal entering the individual timing generation unit 316 in the master, and 413 denotes a reference timing signal entering the individual timing generation unit 317 in the slave. Here, a delay has been added to the reference timing signal 412 by the delay addition unit 314 in the master. Also, a delay has been added to the reference timing signal 413 in view of transmission between two chips. By making the amount of delay added by the delay addition unit 314 equal to the amount of delay added in view of transmission between two chips, the timing of the reference timing signal 412 entering the individual timing generation unit 316 in the video processing LSI chip 301 equals the timing of the reference timing signal 413 entering the individual timing generation unit 317 in the video processing LSI chip 302.

As set forth above, the present invention can achieve a video display apparatus using two video processing LSI chips capable of outputting synchronous videos without adding a separate module for timing generation. Furthermore, the present invention can achieve video processing LSI chips with minimum chip terminals by providing them with a function of extracting synchronizing signals and switching the input/output of chip terminals that transmit/receive timing signals.

Although the timing extraction units 110, 318 and 320 extract the vertical synchronizing timing in the embodiments of the present invention, they are not limited to extracting the vertical synchronizing timing. Alternatively, for example, the timing extraction units 110, 318 and 320 may extract and obtain a horizontal synchronizing timing and flags of even-numbered fields and odd-numbered fields in interlaced signals. Similarly, although the reference timing generation units 108, 306 and 307 generate only the vertical synchronizing timing as the reference timing signal, the present invention is not limited in this way. Furthermore, although the two video processing LSI chips are connected to each other by a total of three timing signal lines, two of them being signal lines for transmitting/receiving the input timing signals and one of them being a signal line for transmitting/receiving the reference timing signal, they are not limited to being connected to each other by three signal lines. For example, it is easily conceivable that the number of signal lines used for connection may vary depending on the number of input timing signals and reference timing signals.

In the embodiments of the present invention, the reference timing generation units 108, 306 and 307 generate the reference timing signal 112 based on the input timing signals 111, 319 and 321. Alternatively, the reference timing signals 112 and 322 may be generated based on, for example, unique timings held in the reference timing generation units 108, 306 and 307.

Although a video processing LSI chip includes one video processing unit 103 and one video processing timing signal 113 in the embodiments of the present invention, the present invention is not limited to this configuration. Alternatively, for example, a video processing LSI chip may be configured such that pipeline processing is performed using a plurality of video processing units and a timing generation unit generates different video processing timing signals for different video processing units.

Although the video reception unit 102 can receive two image signals in the embodiments of the present invention, it is not limited to receiving two image signals. Alternatively, the video reception unit 102 may be configured to receive one image signal, or receive three or more image signals.

Furthermore, although the video processing unit 103 performs processing at the same rate as received videos and the video output unit 104 performs processing at a rate twice as high as the rate of received videos, the present invention is not limited in this way. Depending on the characteristics of received videos, the rates of processing of the video processing unit and the video output unit may be changed.

Although a video processing LSI chip is internally divided into three clock regions in the embodiments of the present invention as shown in FIG. 5, the layout of the division is not limited to this example. For example, the video reception unit 102 and the video processing unit 103 may operate in accordance with difference clocks. Alternatively, a plurality of video processing parts may be provided by dividing the video processing unit 103 into smaller parts, so as to make different video processing parts operate in accordance with different clocks.

The embodiments of the present invention allow controlling the operational timing of a video processing LSI chip without providing an external module for generating a reference timing outside the video processing LSI chip. The delay addition unit 314 in one video processing LSI chip (master) delays a timing by adding delay information to reference timing information. The delay addition unit 315 in the other video processing LSI chip (slave) does not add delay information to reference timing information. This configuration allows synchronizing the reference timing signal to which delay information has been added in one video processing LSI chip with the reference timing signal to which delay information has not been added in the other video processing LSI chip.

An external module for generating a reference timing is required neither when using one video processing LSI chip nor when using a plurality of video processing LSI chips. In the case of a two-chip configuration, the number of chip terminals of the video processing LSI chips can be reduced by sharing a chip terminal for transmitting/receiving timing signals. In this way, a high-resolution video processing apparatus can be constructed at low cost.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2011-275090, filed Dec. 15, 2011, which is hereby incorporated by reference herein in its entirety.

What is claimed is:

1. A control apparatus of a video processing chip, the control apparatus comprising:
    an acquisition unit configured to acquire a first timing signal corresponding to a first video signal and acquire a second timing signal corresponding to a second video signal;
    a reference timing generation unit configured to generate, based on the first and second timing signals acquired by the acquisition unit, a reference timing signal;
    an individual timing generation unit configured to generate, using the reference timing signal, a first processing timing signal related to a timing for video processing of the first video signal and a first output timing signal related to a timing for output of the processed first video signal; and
    a notification unit configured to notify a second control apparatus of a second video processing chip of the reference timing signal generated by the reference timing generation unit such that the second control apparatus generates a second processing timing signal related to a timing for video processing of the second video signal and generates a second output timing signal related to a timing for the output of the processed second video signal.

2. The control apparatus according to claim 1, further comprising:
    a selection unit configured to output to the individual timing generation unit the reference timing signal generated by the reference timing generation unit or an external reference timing signal generated by the second control apparatus; and
    a reference timing delay addition unit configured to delay the reference timing signal output from the selection unit in a case where the selection unit outputs the reference timing signal generated by the reference timing generation unit,
    wherein the individual timing generation unit generates the first processing timing signal and the first output timing signal using the reference timing signal or the external reference timing signal output by the selection unit.

3. The control apparatus according to claim 1, further comprising:
    a reception unit configured to receive the first video signal;
    a video processing unit configured to perform the video processing to the first video signal received by the reception unit;

a first clock switch unit configured to convert the first timing signal which is output based on a timing of a first clock of the reception unit to a timing of a second clock for generating the first processing timing signal; and a second clock switch unit configured to convert the first processing timing signal which has been generated based on the timing of the second clock to a timing of a third clock for the video processing performed by the video processing unit.

4. The timing control apparatus according to claim 1, wherein the acquisition unit acquires the first timing signal by extracting from the first video signal and acquires the second timing signal by receiving from the second control apparatus, and the control apparatus further comprises an input timing delay addition unit matches a timing of the first timing signal input to the reference timing generation unit with a timing of the second timing signal input to the reference timing generation unit by delaying the first timing signal input to the reference timing generation unit.

5. The control apparatus according to claim 1,
wherein, the reference timing generation unit generates the reference timing signal using the first timing signal and the second timing signal, wherein a timing of the first and second timing signals input to the reference timing generation unit is adjusted by delaying the first timing signal input to the reference timing generation unit.

6. The control apparatus according to claim 1, further comprising
an input timing delay addition unit configured to delay the first timing signal input to the reference timing generation unit in a case where the reference timing generation unit generates the reference timing signal, and does not delay the first timing signal output to the second control apparatus in a case where the reference timing generation unit does not generate the reference timing signal and the second control apparatus generates the reference timing signal.

7. The timing control apparatus according to claim 6, wherein when the input timing switch unit does not receive the second timing signal, the reference timing generation unit generates the reference timing signal using the first timing signal which has not been delayed by the input timing delay addition unit.

8. The apparatus according to claim 1, wherein the acquisition unit acquires the second timing signal from the second control apparatus of the second video processing chip.

* * * * *